United States Patent
Takeshita et al.

(10) Patent No.: US 7,897,287 B2
(45) Date of Patent: Mar. 1, 2011

(54) FUEL CELL VEHICLE INCLUDING REACTION-OFF GAS DISCHARGE SYSTEM

(75) Inventors: Masahiro Takeshita, Toyota (JP);
Shigeyuki Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 267 days.

(21) Appl. No.: 12/280,827

(22) PCT Filed: Sep. 27, 2007

(86) PCT No.: PCT/JP2007/069398
§ 371 (c)(1),
(2), (4) Date: Aug. 27, 2008

(87) PCT Pub. No.: WO2008/050594
PCT Pub. Date: May 2, 2008

(65) Prior Publication Data
US 2009/0229899 A1    Sep. 17, 2009

(30) Foreign Application Priority Data
Oct. 26, 2006   (JP)   .............................. 2006-291729

(51) Int. Cl.
H01M 8/04    (2006.01)
(52) U.S. Cl. .................. 429/413; 429/433; 429/450
(58) Field of Classification Search ................ 180/54.1, 180/65.1, 65.21, 65.275, 65.3, 65.31, 165; 429/413, 414, 433, 450
See application file for complete search history.

(56) References Cited

U.S. PATENT DOCUMENTS

| | | | |
|---|---|---|---|
| 6,641,625 B1* | 11/2003 | Clawson et al. | 48/127.9 |
| 7,455,920 B2* | 11/2008 | Sakai | 429/414 |
| 7,537,847 B2* | 5/2009 | Yoshida | 429/423 |
| 2005/0255351 A1* | 11/2005 | Fukuda | 429/22 |
| 2006/0035120 A1* | 2/2006 | Sakai | 429/22 |
| 2006/0210849 A1* | 9/2006 | Bono | 429/22 |
| 2007/0141418 A1* | 6/2007 | Ota et al. | 429/24 |
| 2007/0218330 A1* | 9/2007 | Naganuma | 429/25 |
| 2008/0110514 A1* | 5/2008 | Yoshida | 137/628 |
| 2008/0280185 A1* | 11/2008 | Sasaki et al. | 429/34 |

(Continued)

FOREIGN PATENT DOCUMENTS

JP    2002-373691 A    12/2002

(Continued)

*Primary Examiner* — J. Allen Shriver, II
*Assistant Examiner* — Brodie Follman
(74) *Attorney, Agent, or Firm* — Kenyon & Kenyon LLP

(57) ABSTRACT

A fuel cell vehicle includes: a fuel cell stack for generating electric power by receiving supply of a reaction gas; a humidifying device for delivering an oxidizing off-gas discharged from the fuel cell stack and an oxidizing gas with a water vapor permeable membrane interposed therebetween, and thereby carrying out a moisture exchange between the oxidizing off-gas and the oxidizing gas; and a discharge flow passage for discharging the oxidizing off-gas discharged from the humidifying device to an outside of the vehicle. An oxidizing off-gas outlet that opens toward a front side of the vehicle is formed in the humidifying device. The discharge flow passage is connected to the oxidizing off-gas outlet and is bent in an approximate U shape from a front side of the vehicle to a back side of the vehicle.

3 Claims, 2 Drawing Sheets

U.S. PATENT DOCUMENTS

| | | | |
|---|---|---|---|
| 2009/0004518 A1* | 1/2009 | Fujita | 429/24 |
| 2009/0029226 A1* | 1/2009 | Yamagishi et al. | 429/34 |
| 2009/0038867 A1* | 2/2009 | Jufuku et al. | 180/65.31 |
| 2009/0047163 A1* | 2/2009 | Fujita | 418/206.1 |
| 2009/0142633 A1* | 6/2009 | Kizaki | 429/22 |
| 2009/0145678 A1* | 6/2009 | Yoshida | 180/65.275 |
| 2009/0148728 A1* | 6/2009 | Fujita | 429/13 |
| 2009/0155651 A1* | 6/2009 | Orihashi | 429/22 |
| 2009/0229899 A1* | 9/2009 | Takeshita et al. | 180/65.31 |
| 2009/0233132 A1* | 9/2009 | Hasuka et al. | 429/25 |
| 2009/0258277 A1* | 10/2009 | Fujita | 429/34 |
| 2010/0003577 A1* | 1/2010 | Eguchi et al. | 429/34 |
| 2010/0028740 A1* | 2/2010 | Kume et al. | 429/24 |
| 2010/0068578 A1* | 3/2010 | Katano | 429/24 |
| 2010/0092812 A1* | 4/2010 | Ishiguro et al. | 429/13 |
| 2010/0136440 A1* | 6/2010 | Hashimoto et al. | 429/413 |
| 2010/0151337 A1* | 6/2010 | Kanazawa | 429/413 |
| 2010/0151360 A1* | 6/2010 | Yoshizumi et al. | 429/514 |
| 2010/0167149 A1* | 7/2010 | Ishikawa | 429/434 |
| 2010/0176220 A1* | 7/2010 | Yoshida et al. | 239/418 |
| 2010/0239929 A1* | 9/2010 | Kajiwara et al. | 429/431 |
| 2010/0261079 A1* | 10/2010 | Kells et al. | 429/429 |
| 2010/0285382 A1* | 11/2010 | Hasuka et al. | 429/444 |

FOREIGN PATENT DOCUMENTS

| | | |
|---|---|---|
| JP | 2005-116368 A | 4/2005 |
| JP | 2005-222833 A | 8/2005 |
| JP | 2005-306079 A | 11/2005 |
| JP | 2007188857 A * | 7/2007 |
| WO | WO 2006080551 A1 * | 8/2006 |

* cited by examiner

FUEL CELL VEHICLE INCLUDING REACTION-OFF GAS DISCHARGE SYSTEM

This is a 371 national phase application of PCT/JP2007/069398 filed 27 Sep. 2007, which claims priority to Japanese Patent Application No. 2006-291729 filed 26 Oct. 2006, the contents of which are incorporated herein by reference.

TECHNICAL FIELD

The present invention relates to a fuel cell vehicle in which a fuel cell system is mounted.

BACKGROUND ART

Fuel cell systems are energy conversion systems for supplying a fuel gas and an oxidizing gas to a membrane electrode assembly and generating an electrochemical reaction, so as to convert chemical energy to electrical energy. Among the fuel cell systems, a solid polymer electrolyte fuel cell stack in which a solid polymer membrane is used as an electrolyte is expected to be used as an in-vehicle power source system since the solid polymer electrolyte fuel cell stack can be miniaturized at low cost and has a high output density.

In the fuel cell stack, hydrogen ion produced in an anode moves through an electrolyte membrane to a cathode while being hydrated. Thus, water is insufficient in the vicinity of a surface in the anode side of the electrolyte membrane, which becomes a dry state. In order to continue power generation of the fuel cell stack, it is necessary to supply water to the anode side. The electrolyte membrane for use in the solid polymer electrolyte fuel cell stack has good hydrogen ion conductivity when in a moderately humid state. However, when its water content is lowered, an electrical resistance of the electrolyte membrane increases excessively to prevent the electrolyte membrane from functioning properly.

A method of humidifying a reaction gas by using a humidifying device is well known as the method of supplying water to the electrolyte membrane. For example, Japanese Patent Laid-Open No. 2005-116368 discloses a fuel cell system for humidifying an oxidizing gas by a humidifying device in which a hollow fiber membrane bundle comprising a plurality of hollow fiber membranes is accommodated. A high-humidity oxidizing off-gas including a large amount of water produced by a cell reaction flows inside the hollow fiber membrane, and a low-humidity oxidizing gas introduced from the atmosphere flows outside the hollow fiber membrane. A moisture exchange is carried out between the oxidizing off-gas and the oxidizing gas to humidify the oxidizing gas.

Patent Document 1: Japanese Patent Laid-Open No. 2005-116368

DISCLOSURE OF THE INVENTION

However, when an outlet, from which the oxidizing off-gas from the humidifying device is discharged, opens toward the back side of a fuel cell vehicle which discharges the oxidizing off-gas toward its back side, the following problems occur. For example, when the fuel cell vehicle is stopped with its front side downwardly inclined in an environment below the freezing point, there is a possibility that water remaining in a pipe in the downstream side from the humidifying device flows back to the humidifying device and freezes inside the humidifying device. When water freezes inside the humidifying device, a reaction gas flow passage is closed and the fuel cell vehicle cannot be started.

In the fuel cell vehicle, dilution for mixing a fuel off-gas and an oxidizing off-gas to dilute and discharge the fuel off-gas to the atmosphere is normally mounted. However, when the humidifying device and a dilution device are connected by a straight pipe, there is a possibility that an air flow rate into the dilution device decreases and its dilution performance is deteriorated since produced water by a cell reaction, water vapor or the like is mixed in the oxidizing off-gas flowing from the humidifying device to the dilution device in such a state that the produced water or the water vapor is not separated from air.

It is therefore an object of the present invention to solve the problems as described above, and to prevent reverse flow of water from the pipe in the downstream side from the humidifying device to the humidifying device and improve the dilution performance of the dilution device.

In order to achieve the object as described above, a fuel cell vehicle according to the present invention comprises: a fuel cell stack for generating electric power by receiving supply of a reaction gas; a humidifying device for delivering a reaction off-gas discharged from the fuel cell stack and the reaction gas with a water vapor permeable membrane interposed therebetween, and thereby carrying out a moisture exchange between the reaction off-gas and the reaction gas; and a discharge flow passage for discharging the reaction off-gas discharged from the humidifying device to an outside of the vehicle. A reaction off-gas outlet that opens toward a front side of the vehicle is formed in the humidifying device, and the discharge flow passage is connected to the reaction off-gas outlet and is bent so that the reaction off-gas discharged from the reaction off-gas outlet flows to a front side of the vehicle and then to a back side of the vehicle.

Since the discharge flow passage for delivering the reaction off-gas discharged from a dilution device is bent so that the reaction off-gas flows to the front side of the vehicle and then to the back side of the vehicle, it is possible to prevent reverse flow of water from the pipe in the downstream side from the humidifying device to the humidifying device even when the fuel cell vehicle is stopped with its front side downwardly inclined. An approximate U-shape, an approximate V-shape, and an approximate square U-shape are preferable as the shape of the discharge flow passage.

According to a preferable aspect of the present invention, the fuel cell vehicle may further comprise a dilution device for diluting the reaction off-gas, the dilution device being connected to a downstream side of the discharge flow passage.

The reaction off-gas discharged from the humidifying device is separated to gas and liquid by a centrifugal force in the course of being delivered in the bent discharge flow passage, and therefore, the dilution device can stably introduce air. The dilution performance of the dilution device can be thereby improved.

According to a preferable aspect of the present invention, the fuel cell vehicle may further comprise a muffler for muffling a sound of discharging the reaction off-gas, the muffler being connected to a downstream side of the discharge flow passage.

BEST MODE FOR CARRYING OUT THE INVENTION

The embodiment of the present invention will be described below with reference to each drawing.

Figure 1:
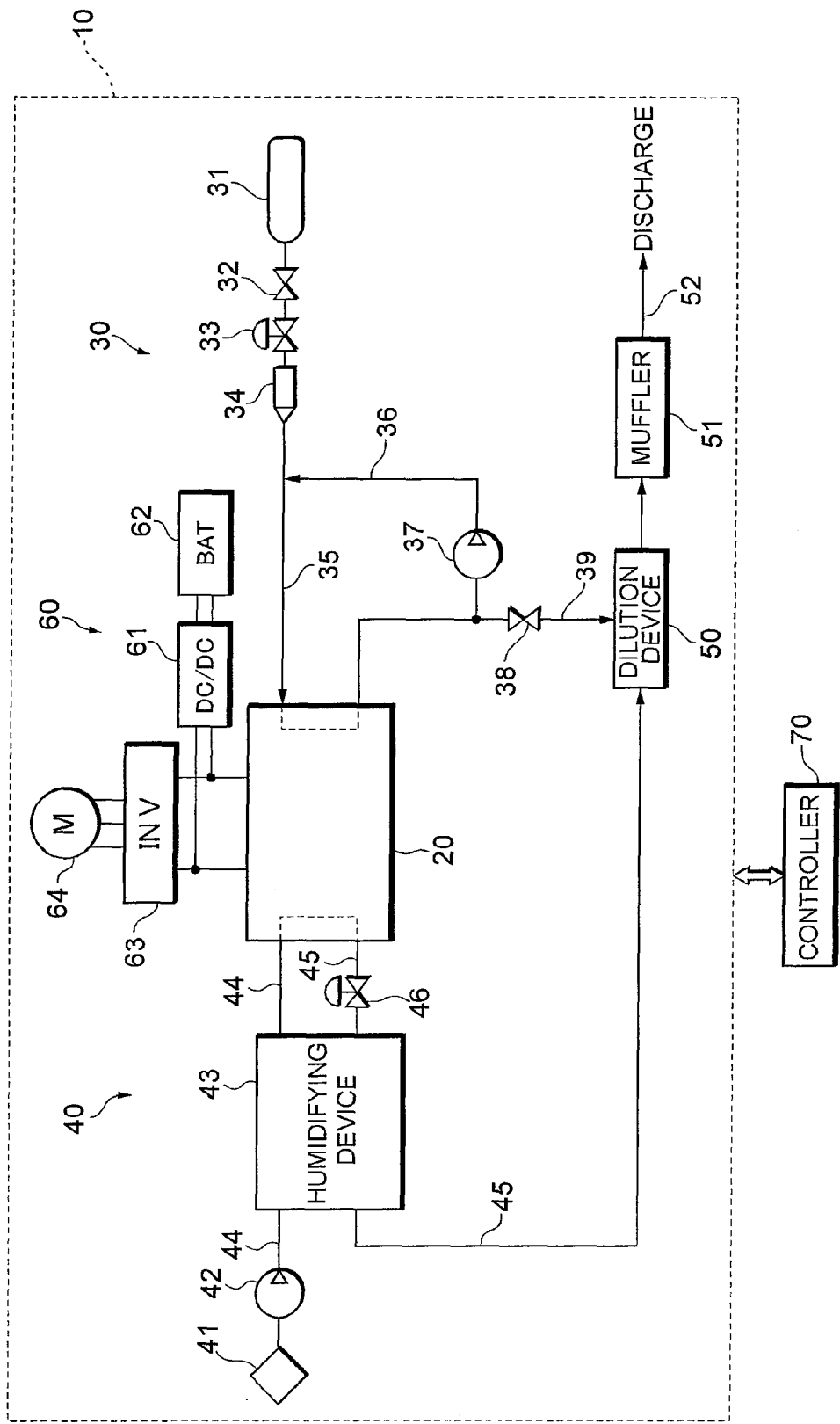
FIG. 1 is a system block diagram of a fuel cell system according to the present embodiment.

FIG. 1 shows a system configuration of a fuel cell system 10 which serves as an in-vehicle power source system of a fuel cell vehicle.

The fuel cell system 10 comprises a fuel cell stack 20 for generating electric power by receiving supply of a reaction gas (oxidizing gas and fuel gas), a fuel gas piping system 30 for supplying a hydrogen gas as the fuel gas to the fuel cell stack 20, an oxidizing gas piping system 40 for supplying air as the oxidizing gas to the fuel cell stack 20, an electric power system 60 for controlling charge and discharge of electric power, and a controller 70 for generally controlling the entire system.

The fuel cell stack 20 is, for example, a solid polymer electrolyte cell stack constituted by a plurality of cells serially stacked in layers. The cells comprise a cathode disposed on one side of an electrolyte membrane constituted by an ion-exchange membrane, an anode disposed on the other side of the electrolyte membrane, and a pair of separators which sandwich the cathode and the anode therebetween. A fuel gas is supplied to a fuel gas flow passage of one of the separators and an oxidizing gas is supplied to an oxidizing gas flow passage of the other one of the separators. The fuel cell stack 20 generates electric power by the gas supply.

The fuel gas piping system 30 comprises a fuel gas supply source 31, a fuel gas supply flow passage 35 in which a fuel gas (hydrogen gas) to be supplied from the fuel gas supply source 31 to the anode of the fuel cell stack 20 flows, a circulation flow passage 36 for returning a fuel off-gas (hydrogen off-gas) discharged from the fuel cell stack 20 to the fuel gas supply flow passage 35, a circulation pump 37 for pressurizing and delivering the fuel off-gas in the circulation flow passage 36 to the fuel gas supply flow passage 35, and an exhaust flow passage 39 branchedly connected to the circulation flow passage 36.

The fuel gas supply source 31 is constituted by, for example, a high-pressure hydrogen tank or a hydrogen storage alloy, and stores a hydrogen gas of, for example, 35 MPa or 70 MPa. When an isolation valve 32 is opened, the hydrogen gas flows from the fuel gas supply source 31 to the fuel gas supply flow passage 35. The pressure of the hydrogen gas is reduced to, for example, around 200 kPa by a regulator 33 or an injector 34, and the hydrogen gas is supplied to the fuel cell stack 20.

The fuel gas supply source 31 may be constituted by a reformer for producing a reformed gas rich in hydrogen from a hydrocarbon fuel, and a high-pressure gas tank for bringing the reformed gas produced by the reformer into a high pressure state and accumulating the gas.

The injector 34 is an electromagnetically driven on-off valve capable of regulating a gas flow rate or a gas pressure by directly driving a valve body with an electromagnetic driving force at predetermined drive intervals to separate the valve body from a valve seat. The injector 34 comprises a valve seat having a spray hole for spraying a gaseous fuel such as a fuel gas, a nozzle body for supplying and guiding the gaseous fuel to the splay hole, and a valve body for opening and closing the splay hole, the valve body being movably accommodated and held in a shaft direction (gas flow direction) with respect to the nozzle body.

The exhaust flow passage 39 is connected to the circulation flow passage 36 via an exhaust valve 38. The exhaust valve 38 is actuated by an instruction from the controller 70, to discharge the fuel off-gas including impurities and water in the circulation flow passage 36 to the outside. By opening the exhaust valve 38, an impurity concentration in the hydrogen off-gas in the circulation flow passage 36 is decreased and a hydrogen concentration in the fuel off-gas to be circulated and supplied is increased.

The fuel off-gas discharged via the exhaust valve 38 and the exhaust flow passage 39, and an oxidizing off-gas flowing in a discharge flow passage 45 flow into a dilution device 50, and the dilution device 50 dilutes the fuel off-gas. The sound of discharging the diluted fuel off-gas is muffled by a muffler (silencer) 51 and the diluted fuel off-gas is discharged to the outside of the vehicle via a tailpipe 52.

The oxidizing gas piping system 40 comprises an oxidizing gas supply flow passage 44 in which the oxidizing gas to be supplied to the cathode of the fuel cell stack 20 flows, and the discharge flow passage 45 in which the oxidizing off-gas discharged from the fuel cell stack 20 flows. An air compressor 42 for introducing the oxidizing gas via a filter 41 and a humidifying device 43 for humidifying the oxidizing gas pressurized and delivered by the air compressor 42 are disposed in the oxidizing gas supply flow passage 44. A back pressure regulating valve 46 for regulating the supply pressure of the oxidizing gas and the humidifying device 43 are disposed in the discharge flow passage 45.

The humidifying device 43 accommodates a water vapor permeable membrane bundle (hollow fiber membrane bundle) comprising a plurality of water vapor permeable membranes (hollow fiber membranes). A high-humidity oxidizing off-gas (wet gas) including a large amount of water produced by a cell reaction flows inside the water vapor permeable membrane, and a low-humidity oxidizing gas (dry gas) introduced from the atmosphere flows outside the water vapor permeable membrane. A moisture exchange is carried out between the oxidizing gas and the oxidizing off-gas with the water vapor permeable membrane interposed therebetween, so as to humidify the oxidizing gas.

The electric power system 60 comprises a DC/DC converter 61, a battery 62, a traction inverter 63, and a traction motor 64. The DC/DC converter 61 is a direct current voltage converter, and has a function of increasing the pressure of a direct current voltage from the battery 62 and outputting the direct current voltage to the traction inverter 63, and a function of decreasing the pressure of a direct current voltage from the fuel cell stack 20 or the traction motor 64 and charging the battery 62 with the direct current voltage. By the functions as described above of the DC/DC converter 61, charge and discharge of the battery 62 is controlled. By controlling voltage conversion by the DC/DC converter 61, an operation point (output voltage, output current) of the fuel cell stack 20 is controlled.

The battery 62 is an electric storage device capable of charging and discharging electric power, and serves as a storage source of regenerative energy during regeneration of a brake and an energy buffer during load change accompanying acceleration and deceleration of a fuel cell vehicle. For example, rechargeable batteries such as a nickel-cadmium storage battery, a nickel-hydrogen storage battery, and a lithium rechargeable battery are preferably used as the battery 62.

The traction inverter 63 converts direct current electricity to a three-phase alternating current and supplies the three-phase alternating current to the traction motor 64. The traction motor 64 is, for example, a three-phase alternating current motor and constitutes a power source of a fuel cell vehicle.

The controller 70 is a computer system comprising CPU, ROM, RAM, and an input and output interface, and controls each section of the fuel cell system 10. For example, when the controller 70 receives a start signal output from an ignition switch (not shown), the controller 70 starts operating the fuel cell system 10, and calculates required electric power of the entire system based on an accelerator position signal output from an accelerator sensor (not shown) or a vehicle speed signal output from a vehicle speed sensor (not shown). The required electric power of the entire system is a total sum of vehicle running electric power and accessory electric power. The accessory electric power includes, for example, electric power consumed by in-vehicle accessories (humidifying device, air compressor, hydrogen pump, cooling water circulation pump or the like), electric power consumed by apparatuses necessary for vehicle running (change gear, wheel control device, steering device, suspension device or the like), and electric power consumed by apparatuses disposed in a passenger space (air conditioner, lightning apparatus, audio system or the like).

The controller 70 determines output power distribution of the fuel cell stack 20 and the battery 62, adjusts a revolution speed of the air compressor 42 or a valve position of the injector 34, and adjusts the amount of the reaction gas supplied to the fuel cell stack 20 so that power generation of the fuel cell stack 20 agrees with the target electric power. The controller 70 also controls the DC/DC converter 61 and adjusts an output voltage of the fuel cell stack 20 to control the operation point (output voltage, output current) of the fuel cell stack 20. The controller 70 also outputs various alternating-current voltage command values of U phase, V phase and W phase, as a switching command, to the traction inverter 63, and controls an output torque and a revolution speed of the traction motor 64 so that a target vehicle speed corresponding to an accelerator position can be obtained.

Note that FIG. 1 is only for purposes of schematically explaining the system configuration and an actual in-vehicle layout is not reflected therein.

Figure 2:
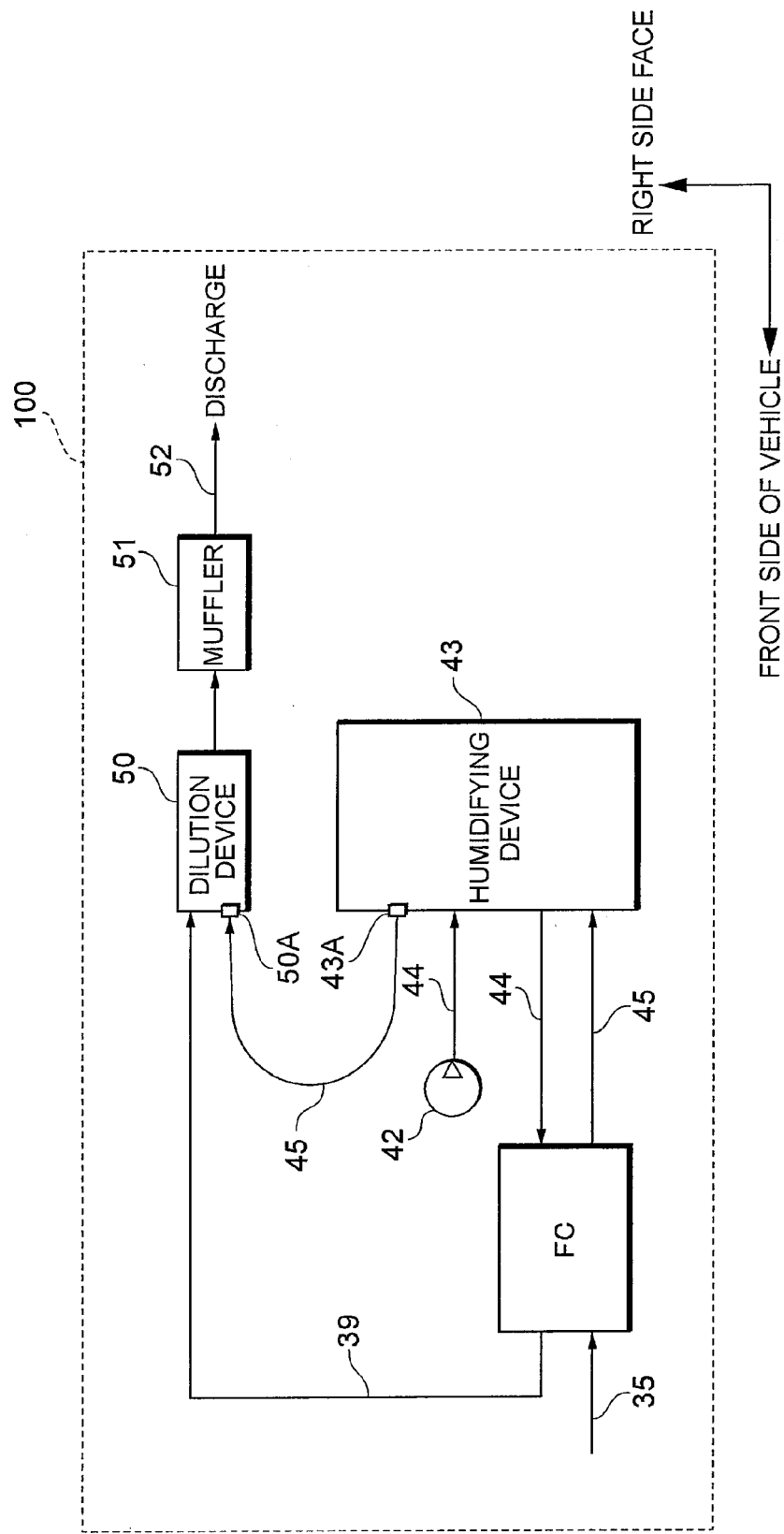
FIG. 2 is an in-vehicle layout of a fuel cell system.

Next, the in-vehicle layout of the fuel cell system 10 will be described with reference to FIG. 2. For the purpose of simplifying the description, the in-vehicle layout of only the fuel cell stack 20, the air compressor 42, the humidifying device 43, the dilution device 50, the muffler 51 and the tailpipe 52 is shown and other devices are omitted in FIG. 2. The devices having the same reference numerals as those in FIG. 1 represent the same devices and the detailed description thereof is omitted.

Reference numeral 100 denotes a fuel cell vehicle. The left side in the drawing is the front side of the vehicle and the upper side in the drawing is the right side face of the vehicle.

An oxidizing off-gas outlet 43A formed in the humidifying device 43 opens toward the front side of the vehicle. The discharge flow passage 45 is connected to the oxidizing off-gas outlet 43A and is bent in an approximate U shape so that the discharge flow passage 45 is oriented from the front side of the vehicle toward the back side of the vehicle. The dilution device 50 is connected to the downstream side of the discharge flow passage 45, and the muffler 51 is connected to the downstream side therefrom. The tailpipe 52 is disposed in an approximate straight shape toward the back side of the vehicle.

With the configuration as described above, since the discharge flow passage 45 is bent in an approximate U shape, water remaining in the piping system in the downstream side from the humidifying device 43 (tailpipe 52, muffler 51, dilution device 50 or the like) flows back only to the middle of the discharge flow passage 45 (around the bent point) and the water does not flow back to the humidifying device 43 even when the fuel cell vehicle 100 is stopped with its front side downwardly inclined. Starting failure of the fuel cell system 10 due to freezing of the humidifying device 43 can be thereby avoided. In order to effectively prevent reverse flow of water to the humidifying device 43 when the fuel cell vehicle 100 is stopped with its front side downwardly inclined, the oxidizing off-gas outlet 43A may be provided in a position higher than the piping system in the downstream side from the humidifying device 43 (tailpipe 52, muffler 51, dilution device 50 or the like).

Since the discharge flow passage 45 is bent in an approximate U shape, the oxidizing off-gas discharged from the humidifying device 43 is separated to gas and liquid by a centrifugal force in the course of being delivered in the discharge flow passage 45. The water separated from the gas remains around a wall surface of the discharge flow passage 45, and therefore, air including little water or water vapor flows into an air introduction opening 50A of the dilution device 50. Since water is rarely mixed into the air introduction opening 50A, a stable air introduction amount can be ensured and the dilution performance of the dilution device 50 can be improved.

Note that the shape of the discharge flow passage 45 is not limited to the approximate U-shape, and, for example, an approximate V-shape and an approximate square U-shape may be used.

Although an example in which the fuel cell system 10 according to the present embodiment is mounted on the fuel cell vehicle as the power source is shown in the above description, the fuel cell system 10 may be mounted on other moving bodies (robots, ships, aircrafts or the like) than the fuel cell vehicle as the power source.

INDUSTRIAL APPLICABILITY

According to the present invention, the discharge flow passage for delivering the reaction off-gas discharged from the dilution device is bent so that the reaction off-gas discharged from the reaction off-gas outlet flows to the front side of the vehicle and then to the back side of the vehicle, and therefore, it is possible to prevent reverse flow of water from the pipe in the downstream side from the humidifying device to the humidifying device even when the fuel cell vehicle is stopped with its front side downwardly inclined. Since the reaction off-gas discharged from the humidifying device is separated to gas and liquid by a centrifugal force in the course of being delivered in the discharge flow passage, air can be stably introduced into the dilution device. Accordingly, it is possible to improve the dilution performance of the dilution device.

The invention claimed is:

1. A fuel cell vehicle comprising:
   a fuel cell stack for generating electric power by receiving supply of a reaction gas;
   a humidifying device for delivering a reaction off-gas discharged from the fuel cell stack and the reaction gas with a water vapor permeable membrane interposed therebetween, and thereby carrying out a moisture exchange between the reaction off-gas and the reaction gas; and
   a discharge flow passage for discharging the reaction off-gas discharged from the humidifying device to an outside of the vehicle,
   wherein a reaction off-gas outlet that opens toward a front side of the vehicle is formed in the humidifying device, and the discharge flow passage is connected to the reaction off-gas outlet such that the passage is routed towards the front of the vehicle and arcuately bends to a route facing the rear off the vehicle so that the reaction off-gas discharged from the reaction off-gas outlet flows to a front side of the vehicle and then to a back side of the vehicle.

2. The fuel cell vehicle according to claim 1, further comprising a dilution device for diluting the reaction off-gas, wherein the dilution device is connected to a downstream side of the discharge flow passage.

3. The fuel cell vehicle according to claim 1, further comprising a muffler for muffling a sound of discharging the reaction off-gas, wherein the muffler is connected to a downstream side of the discharge flow passage.

* * * * *

UNITED STATES PATENT AND TRADEMARK OFFICE
CERTIFICATE OF CORRECTION

PATENT NO. : 7,897,287 B2  Page 1 of 1
APPLICATION NO. : 12/280827
DATED : March 1, 2011
INVENTOR(S) : Masahiro Takeshita et al.

It is certified that error appears in the above-identified patent and that said Letters Patent is hereby corrected as shown below:

| Column | Line | |
|---|---|---|
| 6 | 66 | Change "rear off" to --rear of--. |

Signed and Sealed this
Twenty-eighth Day of June, 2011

David J. Kappos
*Director of the United States Patent and Trademark Office*